No. 764,734.

Patented July 12, 1904.

UNITED STATES PATENT OFFICE.

RICHARD LAUCH, OF UERDINGEN, GERMANY.

DIRECT COTTON SULFUR DYE AND PROCESS OF MAKING SAME.

SPECIFICATION forming part of Letters Patent No. 764,734, dated July 12, 1904.

Application filed August 7, 1901. Serial No. 71,257. (Specimens.)

*To all whom it may concern:*

Be it known that I, RICHARD LAUCH, chemist and doctor of philosophy, a subject of the Emperor of Germany, residing at Uerdingen-on-the-Rhine, Germany, have invented certain new and useful Improvements in the Manufacture of Direct-Dyeing Cotton Sulfur Dyestuffs by Boiling Paraämidodinitrodiphenylamin with a Solution of Sulfur and Sodium Sulfids, (for which I demanded patents in Germany the 2d of January, 1901, in England the 8th of January, 1901, and in France the 10th of May, 1901;) and I do declare that the following is a full, clear, and exact description thereof, which will enable others skilled in the art to which it appertains to make and use the same.

This invention relates to the production of direct-dyeing cotton sulfur dyestuffs.

If paraämidodinitrodiphenylamin obtained by the action of orthoparadinitrochlorbenzol upon paraphenylendiamin in accordance with the process described in the German Patent No. 105,632 is heated with sulfur and sulfur alkalies up to 220° to 240°, a weak olive color is obtained. Very fine dark-blue and black sulfur dyes are obtained from this paraämidoörthoparadinitrodiphenylamin if the procedure be in the manner described in my United States applications Serial Nos. 69,036 and 69,037. The heating is at a considerably lower temperature than used in German Patent No. 105,632, and a diluting medium, as water, is used, and eventually glycerin. The products dissolve blue in water, black-blue with the addition of sulfuret of sodium. It has, furthermore, been ascertained that the products diluted with water, if prepared with temperatures lower than those described in my said United States applications Serial Nos. 69,036 and 69,037, will give forth new dyestuffs. If, for instance, the product is boiled in the reflux-boiler at 120° for a considerable time, it will dissolve with a pure violet-red color. Longer or shorter boiling will bring about a dark-blue to black color, and these stuffs will dye more violet than the dyestuffs of said applications Serial Nos. 69,036 and 69,037 and are entirely different from the dyestuffs therein described. It has been found that for the production of these dyestuffs the heating in the reflux-boiler should not be effected under a temperature of, for instance, 110°, such a temperature being too low. This temperature produces after twenty-four hours only a slow and incomplete change of the paraämidodinitrodiphenylamin, and a reddish-blue product is obtained containing insoluble matter.

If paraämidodinitrodiphenylamin obtained by the condensation of paraphenylendiamin with 1.3.4. dinitrochlorbenzene is boiled in a reflux-boiler with a watery solution of sodium sulfid and sulfur, there will be a slow and incomplete transformation of the paraämidodinitrodiphenylamin to a valuable dyestuff. A heating of twenty-four hours gives a reddish-brown solution and a hard insoluble mass is separated; but if a higher temperature of the solution than 110° centigrade is employed, which temperature is obtained by the evaporation of the greatest part of water, then the solution raised from 110° to 115° to 125° centigrade and then the melt allowed to boil in a reflux-boiler, a heating of about thirty to thirty-six hours will give a complete transformation of the insoluble paraämidodinitrodiphenylamin to a very valuable dyestuff. The formed dyestuff, which is partly separated, dissolves easily and completely with a clear violet color and dyes cotton directly dark violet-blue. If to the melt a dissolving agent like glycerin is added, there will be obtained a quicker formation of the dyestuff. A heating of twenty hours will be sufficient, and the formed dyestuff will dissolve in the melt. Boiling for more than twenty hours will give a dark-blue color, and a boiling, for instance, of forty hours will produce black. The longer the heating the faster the dyestuff will become, and the color will change from blue to black.

The following will explain more exactly in what manner I proceed in order to carry out my invention: thirty-six parts, by weight, of paraämidodinitrodiphenylamin are introduced in a solution of one hundred and eighty parts, by weight, of sodium-sulfid cryst.; sixty parts, by weight, of sulfur; sixty parts, by weight, of water, and the mixture boiled to evaporate the water until the temperature of the solution has raised from 110° to 125° centigrade, which point is obtained by a boiling of about one-half to one hour. Then the solution is further boiled with a reflux-boiler for about thirty-six hours, or for twenty hours, if to the solution at 125° centigrade thirty-six parts of glycerin have been added. The formed dyestuff can be separated from its solution by acids or by the introduction of air, or the solution may be completely dried by the evaporation of the water. The dyestuff thus formed dyes in dark-blue shades with reddish shade; but if the solutions are heated a longer time—one day longer, for example—or if the solutions are evaporated to dryness by a longer heating at temperatures from about 120° to 130° without a reflux-boiler, then the shades become black. If the melt with glycerin is boiled, three dies result, which are distinguished by their fastness. The longer the heating the better for the fastness of the dyestuff in washing. The other physical qualities remain nearly the same. The dyestuffs form when separated a violet-black powder soluble in cold concentrated sulfuric acid, giving a violet to blue solution on addition of water, and a blue precipitate dissolving in water by the addition of sodium-sulfid violet and dyeing cotton in a bath containing sodium sulfid and becoming favorably influenced by further treatment with metallic salts, like bichromate or sulfate of copper.

The same or similar dyestuffs are obtained if for the paraämidodinitrodiphenylamin having the constitution

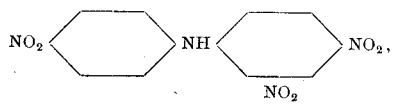

its first reduced product, diamidonitrodiphenylamin having the constitution

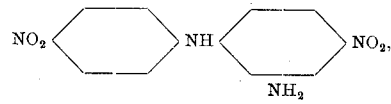

be substituted, which latter can easily be obtained from paraämidodinitrodiphenylamin by reduction with $FNa_2S$, more or less sodium sulfid and sulfur can be used.

The above-given example may be varied in wide limits. As a matter of course I do not confine myself to the figures given in these examples, as they are merely typical.

Having now described my invention and in what manner the same can be performed, what I claim as new is—

1. The sulfur dyes, which result, by boiling paraämidodinitrodiphenylamin of the constitution hereinbefore described with sulfur and sulfids in the presence of diluting agents, which form precipitated from its solution a violet-black powder, soluble in sulfuric acid and giving a violet to blue solution on addition of water and a blue precipitate, dissolving in water by the addition of sodium-sulfid violet, dyeing unmordanted cotton directly in a bath containing sodium sulfid and becoming favorably influenced by further treatment with metallic salts, substantially as hereinbefore set forth.

2. The process of producing sulfur dyes, capable of directly dyeing unmordanted cotton fiber, which process consists in boiling paraämidodinitrodiphenylamin with sulfur and sulfids in the presence of diluting agents, substantially as hereinbefore set forth.

In witness whereof I have hereunto set my hand in presence of two witnesses.

RICHARD LAUCH.

Witnesses:
Wм. P. Phelps,
P. M. Phelps.